C. H. L., F. W. & H. J. MOCHOW.
BOLT LOCK.
APPLICATION FILED JAN. 27, 1914.

1,145,256.

Patented July 6, 1915.

Inventor
Carl H. L. Mochow
H. J. Mochow
Fritz W. Mochow

Witnesses

By
their Attorney

UNITED STATES PATENT OFFICE.

CARL H. L. MOCHOW, FRITZ W. MOCHOW, AND HANS J. MOCHOW, OF DAVENPORT, IOWA.

BOLT-LOCK.

1,145,256.  Specification of Letters Patent.  Patented July 6, 1915.

Application filed January 27, 1914. Serial No. 814,785.

*To all whom it may concern:*

Be it known that we, CARL H. L. MOCHOW, FRITZ W. MOCHOW, and HANS J. MOCHOW, citizens of the United States, residing at Davenport, in the county of Scott and State of Iowa, have invented certain new and useful Improvements in Bolt-Locks, of which the following is a specification, reference being had therein to the accompanying drawing.

This invention relates to a bolt lock and has for its principal object the production of a device wherein the bolt may be passed through a support and may then be positively locked in position to prevent its independent rotation or accidental displacement.

Another object of this invention is the production of a support having a polygonal socket in which the head of a bolt may be positioned after the bolt has been passed through a support at which time a polygonal ring may be positioned upon the head of the bolt for holding the bolt against rotation.

A still further object of this invention is the production of a filling means which may be poured into the socket after the bolt head and ring have been positioned therein whereby the ring will be held against accidental displacement and unauthorized tampering with the bolt is prevented.

With these and other objects in view this invention consists of certain novel combinations, constructions, and arrangements of parts as will be hereinafter fully described and claimed.

Figure 1:
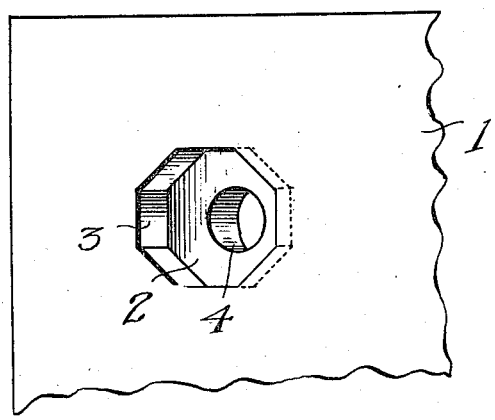
Figure 2:
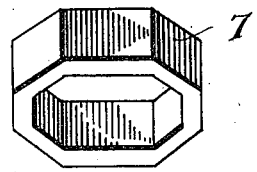
Figure 3:
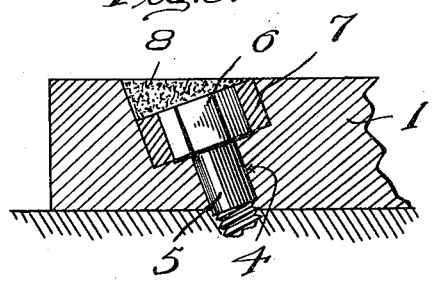

In the accompanying drawing: Figure 1 is a plan view of a portion of a support showing the polygonal socket formed therein. Fig. 2 is a detailed perspective view of the locking ring. Fig. 3 is a fragmentary sectional view through the assembled device illustrating the manner in which the bolt is locked.

Referring to the accompanying drawing by numerals, 1 indicates the support having a polygonal socket 2 formed therein. This socket 2 is provided with a plurality of straight side portions 3 as is clearly disclosed in Fig. 1. An opening 4 is formed so as to extend through the support 1 and communicate with the inner portion of the socket 2. It is of course obvious that this support may comprise any desired element, such, for instance, as the flange of a rail so as to allow the bolt which is used in combination with the device to pass therethrough and retain the same in position. The bolt 5 has a polygonal head 6 formed integrally thereon and this bolt 5 is adapted to be passed through the opening 4 as clearly shown in Fig. 3 so as to allow the head 6 to be positioned within the socket 2. At this time the portion of the head adjacent the body of the bolt 5 will rest upon the bottom portion of the socket while the side portions of the head 6 will be spaced at a distance from the sides 3 of the socket 2 and thereby allow sufficient space for the locking ring 7 to be positioned within the socket. This locking ring 7 is also polygonal in shape and is adapted to be passed over the side portion of the head 6 and fit snugly between the head 6 and the sides 3 of the socket. At this time it will be seen that the bolt will be held against rotation in either direction since the polygonal socket will hold the ring 7 against rotation and this ring 7 will in turn retain the bolt against rotation. A molten substance 8 such, for instance, as lead may be poured into the socket upon the top portions of the head 6 and ring 7. As soon as this molten material becomes hardened, it will positively retain said ring and bolt head against displacement and will also prevent the unauthorized tampering therewith.

From the foregoing description it will be seen that a very simple and efficient bolt lock has been produced whereby the locking elements will be protected, these elements being so formed as to provide a durable and efficient lock for holding the bolt against rotation.

What is claimed as new, is:—

In a device of the class described the combination with a support having a polygonal socket, said support provided with an opening extending therethrough and communicating with the inner portion of said socket, a bolt passing through said opening and having a polygonal head positioned within said socket, and a polygonal ring fitting within said socket and engaging said head for holding said bolt against rotation, said ring having its inner end engaging the bottom of said socket, and a molten material poured into said socket upon the top of said head and ring whereby when said molten material becomes hardened it will prevent the displacement of said ring and bolt.

In testimony whereof we hereunto affix our signatures in presence of two witnesses.

CARL H. L. MOCHOW.
FRITZ W. MOCHOW.
H. J. MOCHOW.

Witnesses:
 ARTHUR JOHNSON,
 CORNELIUS HANSEN.